US011619981B2

(12) United States Patent
Chang et al.

(10) Patent No.: US 11,619,981 B2
(45) Date of Patent: Apr. 4, 2023

(54) DAMPED TOOL-LESS CABLED DRIVE CARRIER

(71) Applicant: QUANTA COMPUTER INC., Taoyuan (TW)

(72) Inventors: Chun Chang, Taoyuan (TW); Wei-Pin Chen, Taoyuan (TW); Kai-Yuan Chuang, Taoyuan (TW); Chin-Tien Huang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 211 days.

(21) Appl. No.: 17/128,995

(22) Filed: Dec. 21, 2020

(65) Prior Publication Data

US 2022/0035425 A1 Feb. 3, 2022

Related U.S. Application Data

(60) Provisional application No. 63/060,416, filed on Aug. 3, 2020.

(51) Int. Cl.
*G06F 1/18* (2006.01)
*H01R 13/422* (2006.01)

(52) U.S. Cl.
CPC ......... *G06F 1/187* (2013.01); *H01R 13/4226* (2013.01); *H01R 2201/06* (2013.01)

(58) Field of Classification Search
CPC ... G06F 1/187; G11B 33/124; H01R 13/6315; H01R 12/7017; H01R 43/26; H01R 13/6273; H01R 13/6272; H01R 13/4226; H01R 2201/06
See application file for complete search history.

(56) References Cited

U.S. PATENT DOCUMENTS

| | | | | |
|---|---|---|---|---|
| 6,122,165 A | * | 9/2000 | Schmitt | G11B 33/022 |
| 6,290,536 B1 | * | 9/2001 | Hwang | H01R 13/631 |
| | | | | 439/378 |
| 6,798,650 B2 | * | 9/2004 | Reznikov | G11B 33/122 |
| | | | | D14/363 |
| 9,392,719 B1 | * | 7/2016 | Chen | G11B 33/124 |
| 10,172,251 B2 | * | 1/2019 | Lee | H05K 7/1408 |

* cited by examiner

*Primary Examiner* — James Wu
(74) *Attorney, Agent, or Firm* — Nixon Peabody LLP

(57) ABSTRACT

A drive (e.g., hard drive) carrier can have a frame with a door that can open to permit installation of the drive and can snap shut to secure the drive within the drive carrier. The drive carrier can include a connector lock, which can take the form of a pair of pins extending from the frame and capable of engaging corresponding retention holes of a connector of a cable. The connector lock can help align the cable's connector with the drive's connector, as well as releasably lock the cable's connector in place when operatively connected to the drive. Damping couplings can couple the carrier frame to a computer chassis. The damping couplings and the flexibility of the cable vibrationally isolate the drive from the chassis, while the connector lock ensures the cable's connector does not unintentionally disconnect from the drive.

17 Claims, 7 Drawing Sheets

DAMPED TOOL-LESS CABLED DRIVE CARRIER

CROSS REFERENCE TO RELATED APPLICATIONS

This application claims priority under 35 U.S.C. § 119 to U.S. Provisional Application No. 63/060,416, entitled "Tool-Less And Rapid Install/Uninstall Carrier For Hard Drive And Cables (SATA/SAS)," and filed on Aug. 3, 2020. The contents of that application are hereby incorporated by reference in their entirety.

TECHNICAL FIELD

The present disclosure relates to computing systems generally, and more specifically to carriers for hard drives and other drives.

BACKGROUND

Drive carriers are used to provide a uniform method of installing and removing drives from a computer system, such as a computer server. In some cases, a drive carrier can be mounted within a computer system via damping mechanisms to provide some degree of vibrational isolation. For example, sources of vibration (e.g., fans) can cause performance and reliability problems for certain drives, such as hard disk drives (HDDs), due to vibrations being conducted to the drive. Current damping mechanisms, while providing some degree of vibrational isolation, fail to sufficiently vibrationally isolate the drive, thereby permitting vibrations to be conducted through parts of the drive, such as its electrical connector.

Some drive carriers rely on directly connecting the electrical connector of the drive to a connector of a board, such as a mother board or an intermediary board (e.g., a storage board). Such direct connections can still permit vibrations to propagate between the drive carrier and other components of the computer system via the direct connection. Drive carriers that attempt to avoid such direct connections often rely on complex mechanisms and cabling, which run the risk of being inadvertently disconnected at inopportune times, resulting in significant downtime and requiring significant maintenance efforts. There is a need for an easy-to-use drive carrier that can permit rapid connection and disconnection of a drive.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, supplemented by this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Embodiments of the present disclosure include a drive carrier that comprises a carrier frame for receiving a drive. The carrier frame includes a connector opening positioned to permit a connector of a cable to establish a connection with a connector of the drive when the drive is received by the carrier frame. The drive carrier also comprises a carrier door that is coupled to the carrier frame and movable between an open position and a closed position. The carrier door permits insertion of the drive into, or removal of the drive out of, the carrier frame when the carrier door is in the open position. The carrier door retains the drive within the carrier frame when the carrier door is in the closed position. The drive carrier also comprises a connector lock coupled to the carrier frame. The connector lock is configured to prevent disconnection of the connector of the cable when the connector lock is engaged.

In some cases, the drive carrier also comprises a damping coupling coupled to the carrier frame. The damping coupling is operable to couple the carrier frame to an object, and to vibrationally isolate the carrier frame from the object. In some cases, the connector lock includes a retention pin for engaging a retention hole of the connector of the cable. In some cases, the connector lock includes an additional retention pin, wherein the retention pin and the additional retention pin are located on opposite ends of the connector opening. In some cases, the connector lock includes a pair of retention pins positioned on opposite ends of the connector opening. Each of the pair of retention pins is elastically deflectable towards the other from a resting position to a disengaged position. The connector lock permits disconnection of the connector of the cable when each of the retention pins is in its respective disengaged position. In some cases, the carrier door is configured to facilitate insertion of the drive into, or removal of the drive out of, the carrier without the use of tools.

Embodiments of the present disclosure include a system that comprises a chassis, a motherboard coupled to the chassis, and a drive carrier coupled to the chassis. The drive carrier houses a drive having a drive connector. The drive carrier also vibrationally isolates the drive from the chassis. The drive carrier includes a connector lock. The system also comprises a data cable operatively coupling the drive to the motherboard. The data cable has a cable connector operatively coupled to the drive connector. The connector lock of the drive carrier releasably engages the cable connector to prevent decoupling of the cable connector and the drive connector.

In some cases, the drive carrier is coupled to the chassis by a damping coupling. In some cases, the connector lock includes a retention pin extending from a frame of the drive carrier. In some cases, the connector lock includes an additional retention pin extending from the frame of the drive carrier. The retention pin and the additional retention pin are positioned on opposite ends of a connector opening. The connector opening is positioned to permit the cable connector to establish a connection with the drive connector. In some cases, the connector lock includes a pair of retention pins positioned on opposite ends of a connector opening. The connector opening is positioned to permit the cable connector to establish a connection with the drive connector. Each of the pair of retention pins is elastically deflectable towards the other, from a resting position to a disengaged position. The connector lock permits disconnection of the cable connector from the drive connector when each of the retention pins is in its respective disengaged position. In some cases, the drive carrier includes a carrier door coupled to a carrier frame. The carrier door is movable between an open position and a closed position. The carrier door permits insertion of the drive into, or removal of the drive out of, the carrier frame when the carrier door is in the open position. The carrier door retains the drive within the carrier frame when the carrier door is in the closed position. In some cases, the carrier door is configured to facilitate insertion of the drive into or removal of the drive out of the carrier without the use of tools.

Embodiments of the present disclosure include a method comprising providing a drive carrier having a carrier frame, a carrier door, and a connector lock. The method further comprises installing a drive in the drive carrier, the drive having a drive connector. Installing the drive includes opening the carrier door to permit insertion of the drive, inserting the drive, and closing the carrier door to retain the drive in the drive carrier. The method further comprises securing the drive carrier to a chassis housing a motherboard and operatively coupling the drive to the motherboard using a cable having a cable connector. Operatively coupling the drive to the motherboard includes operatively coupling the cable connector and the drive connector. The method further comprises engaging the connector lock to prevent the cable connector from disconnecting from the drive connector.

In some cases, securing the drive carrier includes coupling the drive carrier to the chassis using a damping coupling. In some cases, engaging the connector lock occurs automatically in response to coupling the cable connector and the drive connector. In some cases, engaging the connector lock includes passing a retention pin of the connector lock through an aperture of the cable connector. In some cases, the connector lock includes a pair of retention pins positioned on opposite ends of a connector opening. The connector opening is positioned to permit the cable connector to couple with the drive connector. The method further comprises disengaging the connector lock and removing the cable connector. Disengaging the connector lock includes moving each of the pair of retention pins to a disengaged position by applying force on the respective retention pin to deflect the respective retention pin towards the other retention pin. The connector lock permits disconnection of the cable connector from the drive connector when each of the retention pins is in its respective disengaged position. In some cases, installing the drive in the drive carrier is performed without the use of tools. In some cases, engaging the connector lock includes engaging a retention pin of the connector lock with a corresponding aperture of the cable connector in a snap-fit arrangement.

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1:
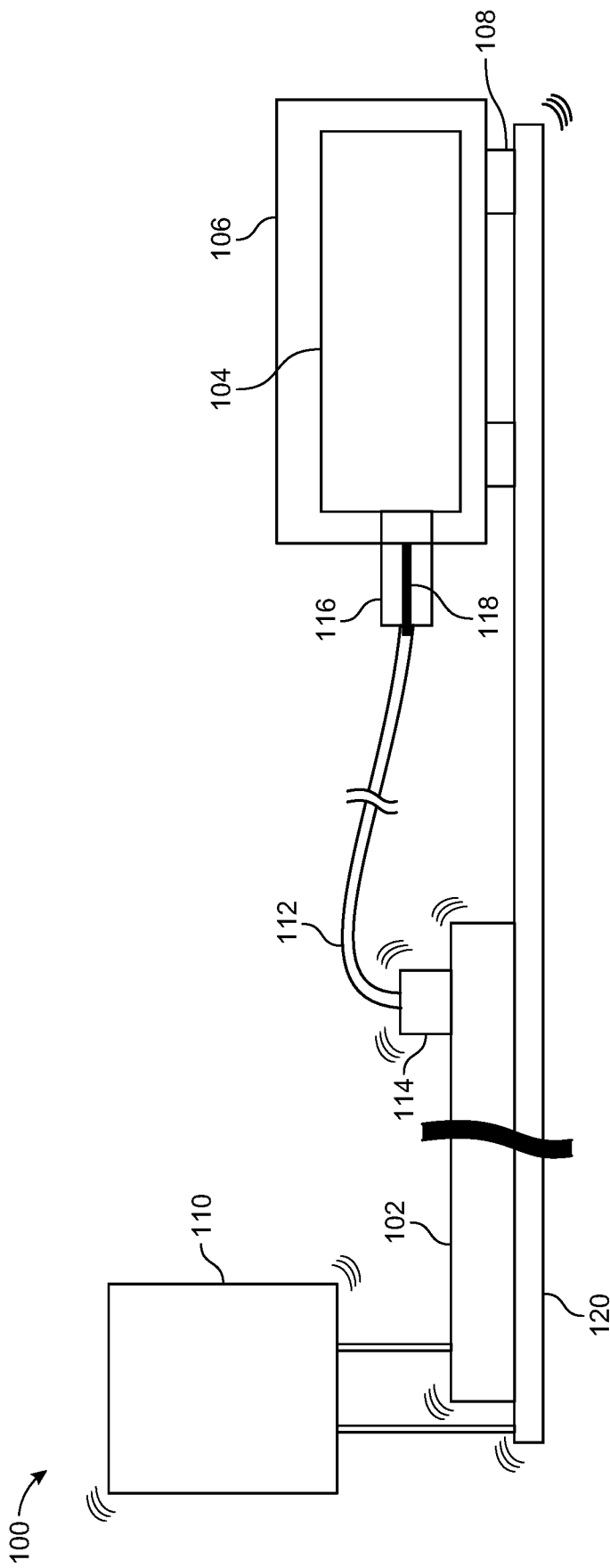
FIG. 1 is a schematic diagram depicting a computer system with a drive carrier, according to certain aspects of the present disclosure.

Certain aspects and features of the present disclosure relate to a drive (e.g., hard drive) carrier capable of tool-less drive replacement and having a connector lock for a cable connector that facilitates improved vibrational isolation of the drive. The drive carrier can have a frame with a door that can open to permit installation of the drive and can snap shut to secure the drive within the drive carrier. The drive carrier can include a connector lock, which can take the form of a pair of pins extending from the frame and capable of engaging a retention hole of a connector of a cable. The connector lock can help align the cable's connector with the drive's connector, as well as releasably lock the cable's connector in place while operatively connected to the drive. The carrier frame can include damping couplings that couple the frame to a computer chassis. When installed, the damping couplings and the flexibility of the cable vibrationally isolate the drive from the chassis and any vibrational sources associated with the chassis, while the connector lock ensures the cable's connector does not inadvertently disconnect from the drive.

Certain aspects of the disclosed drive carrier include a frame with a door. When opened, the door permits a drive to be inserted into the carrier frame. The drive can optionally engage features of the frame (e.g., alignment studs) to properly position the drive within the carrier frame. The door can be closed to secure the drive within the carrier frame. The door can include alignment studs or other features that can engage the drive as the door is being closed, to facilitate properly positioning the drive within the carrier frame. The door can be hinged to the carrier frame, such as at a corner of the drive carrier. The door can removably couple to the carrier frame (e.g., opposite the hinge) to removably fix the door in place with respect to the carrier frame. The door can be removably coupled to the carrier frame by a tool-lessly releasable fitting, such as a snap fit (e.g., a cantilever snap fit). Thus, the drive carrier facilitates easy installation, removal, and replacement of the drive by hand, without the need for tools.

The drive carrier can include an opening in the carrier frame that exposes the drive connector (e.g., the electrical connector of the drive) for connection, such as to a cable connector (e.g., a connector of a cable). The carrier frame can include a connector lock configured to removably couple the cable connector to the drive carrier. The connector lock can take the form of one or a pair retention pins that extend from the carrier frame and engage respective aperture(s) (e.g., retention hole(s)) in the cable connector to secure the cable connector to the drive carrier. Each retention pin can removably couple the drive carrier to the cable connector, such as by a tool-lessly releasably fitting, such as a snap fit (e.g., a cantilever snap fit or annular snap fit). Thus, the cable connector can be unlocked and removed from the drive carrier by hand, without the need for tools.

When the cable is connected to the drive (e.g., the cable connector is operatively coupled to the drive connector), the cable is removably fixed to the drive carrier via the connector lock. The cable can have sufficient flexibility and length to provide vibrational damping. Thus, by installing the drive carrier in a chassis via damping couplings (e.g., rubber washers or other damping features), the drive will maintain vibrational isolation from the chassis because the flexible cable is able to vibrationally isolate the drive connector from the chassis. The ability for the cable connector to be easily secured to the (otherwise vibrationally isolated) drive chassis ensures the cable connector will not unintentionally disconnect and will not unintentionally contact other vibration-conducting parts of the chassis. The ability for the cable connector to be easily removed by hand, without the need for tools, permits the drive in this drive carrier with improved vibrational isolation to be quickly and easily installed, removed, or replaced.

These illustrative examples are given to introduce the reader to the general subject matter discussed here and are not intended to limit the scope of the disclosed concepts. The following sections describe various additional features and examples with reference to the drawings in which like numerals indicate like elements. Directional descriptions are used to describe the illustrative embodiments but, like the illustrative embodiments, should not be used to limit the present disclosure. The elements included in the illustrations herein may not be drawn to scale.

FIG. 1 is a schematic diagram depicting a computer system 100 with a drive carrier 106, according to certain aspects of the present disclosure. The computer system 100 can include a chassis body 120, a motherboard 102, a vibration source 110, and a drive carrier 106. The drive carrier 106 can include a drive 104 secured therein, such as a hard drive. While the motherboard 102 is depicted in FIG. 1, any suitable board other than a motherboard 102 can be replaced for the motherboard 102, such as an intermediary board like a storage board.

The vibration source 110 can be any source of vibrations, such as a fan, another hard drive, an optical media drive, a tape drive, or other device (e.g., a motorized device). As depicted with thick dark lines, the vibration source 110 can be mechanically coupled to the chassis body 120 and/or the motherboard 102. The motherboard 102 can be mechanically coupled to the chassis body 120. Thus, vibrations from the vibration source 110 can be conducted into the motherboard 102 (and thus into the chassis body 120), can be conducted into the chassis body 120 (and thus into the motherboard 102), or can be conducted into both the motherboard 102 and the chassis body 120. In some computer systems 100, the vibration source 110 can be another drive, which may be substantially vibrationally isolated from the chassis body 120, but which may nevertheless conduct some amount of vibration into the chassis body 120.

The drive carrier 106 can be mounted (e.g., physically coupled) to the chassis body 120 by damping couplings 108. A damping coupling 108 can absorb some, most, or all of the vibrations conducted into the damping coupling 108. Any suitable damping couplings 108 can be used, such as vibration-absorbing rubber washers or other vibration-absorbing couplings. Thus, damping coupling 108 can help vibrationally isolate the drive carrier 106 from the chassis body 120, thus vibrationally isolating the drive 104 from the vibration source 110.

The drive 104 within the drive carrier 106 can include a drive connector, which can take the form of an edge connector (e.g., a golden-finger connector) or other connector. The drive connector can thus be an exposed portion of the printed circuit board that is incorporated into the drive and used to control the drive, or can be a connector soldered to that printed circuit board. In some cases, the drive connector can be a SCSI (Small Computer System Interface) connector, a SAS (Serial Attached SCSI) connector, a SATA (Serial Advanced Technology Attachment) connector, or other connector. In some cases, the drive connector can be a plug-type (e.g., male-type) connector designed to fit within a socket-type (e.g., female-type) connector.

The drive can be operatively coupled to the motherboard 102 via a cable 112. The cable 112 can have a proximal cable connector 114 and a distal cable connector 116. The proximal cable connector 114 can couple to the motherboard 102, while the distal cable connector 116 is coupled to the drive 104 (e.g., coupled to the edge connector). While one cable 112 and one set of connectors (e.g., cable connectors 114 and 116) are depicted, any number of cables and cable connectors can be used (e.g., one set for data and one set for power). For example, in some cases, the cable 112 can include a single distal connector (e.g., distal cable connector 116), but can be split to have a data portion and a power portion, each having separate proximal connectors that separately couple to the motherboard 102 or other element.

When installed, the distal cable connector 116 can be secured to the drive carrier 106 via a connection lock 118. Since the proximal cable connector 114 is coupled to the motherboard 102, vibrations from the vibration source 110 will be conducted to the proximal cable connector 114. However, because of the flexibility of the cable 112, the cable 112 itself will absorb some, most, or all of the vibrations induced at the proximal cable connector 114, thus vibrationally isolating the distal cable connector 116 from the proximal cable connector 114, and consequently the vibration source 110.

Thus, the drive carrier 106, the drive 104, and the distal cable connector 116 are all mechanically coupled together, but collectively vibrationally isolated from the chassis body 120, the motherboard 102, and the vibration source 110.

Figure 2:
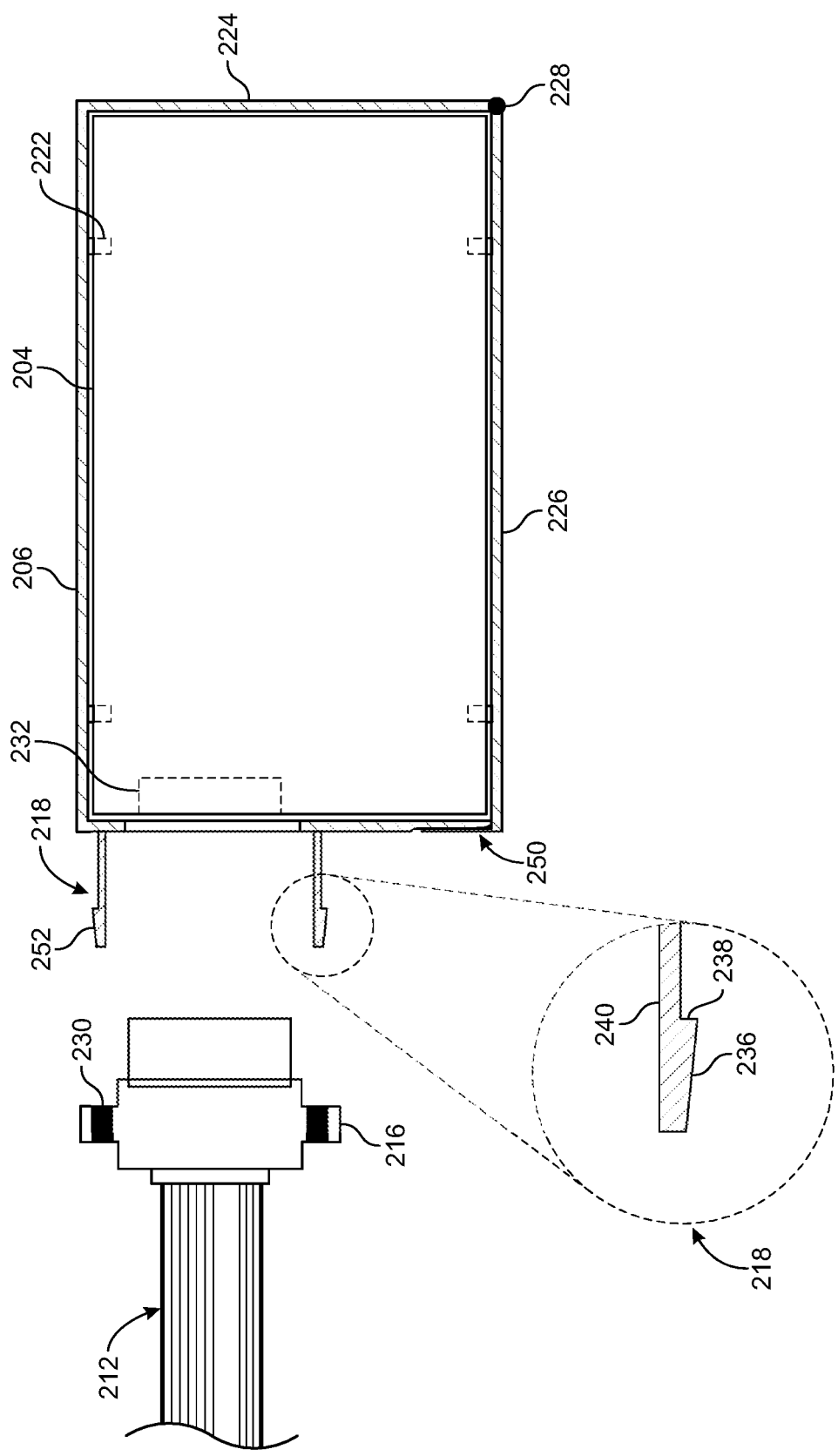
FIG. 2 is a cross-sectional top view of a drive carrier uncoupled from a cable connector, according to certain aspects of the present disclosure.

FIG. 2 is a cross-sectional top view of a drive carrier 206 uncoupled from a cable connector 216, according to certain aspects of the present disclosure. The drive carrier 206, cable connector 216, and connector lock 218 can be drive carrier 106, distal cable connector 116, and connector lock 118 of FIG. 1, respectively.

The drive carrier 206 can include a carrier frame 224 and a carrier door 226 coupled to the carrier frame 224 via a hinge 228. The carrier frame 224 and carrier door 226 can include four alignment studs 222 that engage corresponding apertures (e.g., screw holes) in the drive 204 to help secure the drive 204 in place and properly position the drive 204 with respect to the carrier frame 226. Other numbers of alignment studs 222 can be used. The carrier door 226 can rotate about hinge 228 to an open position, permitting the drive 204 to be installed or removed from the drive carrier 206. The carrier door 226 can be moved to a closed position to secure the drive 206 in place. The carrier door 226 can be held in the closed position by a snap-fit 250 to secure the drive 206 in the carrier frame 224. The snap-fit 250 can include a portion of the carrier door 226 that snaps over a portion of the carrier frame 224. The snap-fit 250 can include an opening, recess, or other feature to facilitate releasing the snap-fit 250 by hand, without the use of tools, to permit movement of the carrier door 226 into the open position.

The carrier frame 224 can include an opening for exposing a drive connector 232 of the drive 204 for connection by the cable connector 216 of cable 212. A connector lock 218 can be located at or adjacent such an opening to secure the cable connector 216 in place when it is coupled with the drive connector 232. The connector lock 218 can include one or more pins 252 or protrusions that extend from the carrier frame 224 and engage corresponding apertures 230 in the cable connector 216.

The pin or protrusion of the connector lock 218 can include a shaft 240, a ledge 238, and an inclined surface 236 to facilitate insertion into a corresponding aperture 230 of the cable connector 216 and retention of the cable connector 216 against the carrier frame 224. The connector lock 218 can couple to the cable connector 216 via a snap-fit connection, such as a cantilever snap-fit (e.g., as depicted in FIG. 2) or an annular snap-fit.

Figure 3:
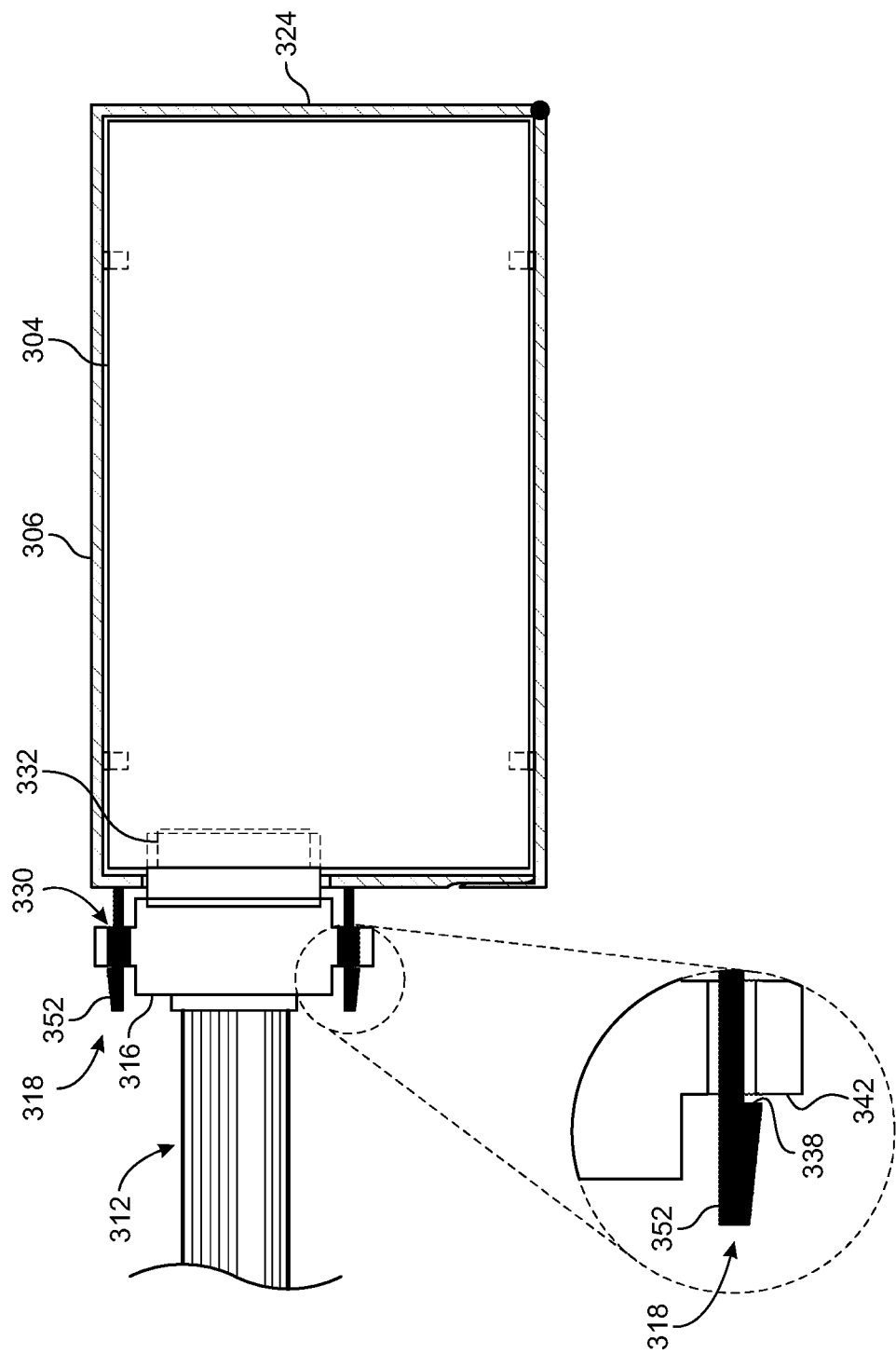
FIG. 3 is a cross-sectional top view of a drive carrier coupled with a cable connector, according to certain aspects of the present disclosure.

FIG. 3 is a cross-sectional top view of a drive carrier 306 coupled with a cable connector 316, according to certain aspects of the present disclosure. The drive carrier 306, cable connector 316, and connector lock 318 can be drive carrier 106, distal cable connector 116, and connector lock 118 of FIG. 1, respectively.

When installed, the drive cable connector 116 can engage and operatively couple with the drive connector 332 of the drive 304. When installed, the drive cable connector 116 can be held in place by the connector lock 318. As depicted, connector lock 318 takes the form of a pair of pins 352 on opposite sides of an opening in the chassis frame 324 through which the cable connector 316 is inserted. The pins 352 of the connector lock 318 pass through corresponding apertures 330 of the cable connector 316 of cable 312.

When the pins 352 of the connector lock 318 pass through the corresponding aperture 330 of the cable connector 316, they removably lock the cable connector 316 in a locked configuration. In this configuration, the cable connector 316 cannot be removed from the drive carrier 306 without manipulation of the connector lock 318. In this configuration, the cable connector 316 is operatively coupled to the drive connector 332, and is thus suitable for providing data and/or power to the drive 304. In the locked configuration, the ledge 338 of the pin 352 engages a surface 342 of the cable connector 316 to keep the cable connector 316 in the locked configuration. Application of pressure to the pin 352 can move the ledge 338 sufficiently to permit the ledge 338 to fit within the aperture 330 of the cable connector 316, thus permitting the cable connector 316 to be removed from the drive carrier 306.

Figure 4:
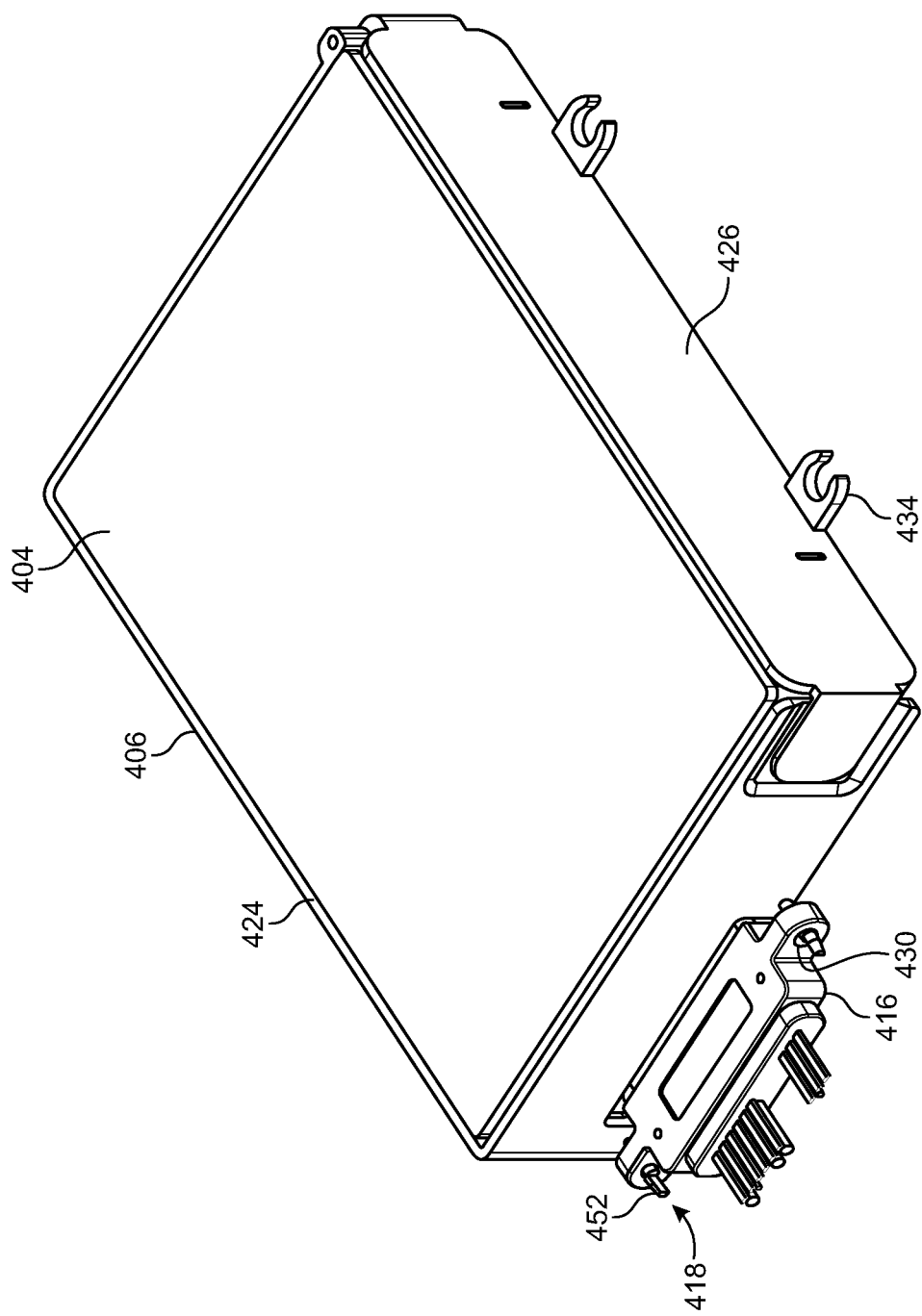
FIG. 4 is an isometric view of a drive carrier coupled to a cable connector, according to certain aspects of the present disclosure.

FIG. 4 is an isometric view of a drive carrier 406 coupled to a cable connector 416, according to certain aspects of the present disclosure. The drive carrier 406, cable connector 416, and connector lock 418 can be drive carrier 06, distal cable connector 116, and connector lock 118 of FIG. 1, respectively.

As depicted in FIG. 4, the drive carrier 406 includes mounting elements 434 (e.g., coupled to the carrier frame 424) and the carrier door 426. The mounting elements 434 can coupled to the drive carrier 406 to a chassis body. In some cases, the mounting elements 434 can be vibration-absorbing elements (e.g., made of a vibration-absorbing material, such as rubber). In some cases, mounting elements 434 can be used with additional vibration-absorbing elements (e.g., fastening hardware made of vibration-absorbing materials, such as rubber or foam) to vibrationally isolate the drive carrier 406 from a chassis body.

The cable connector 416 is depicted as being in a locked configuration; the cable connector 416 being operatively coupled to the drive 404 within the drive carrier 406 and locked in place by the connector lock 418. The pins 452 of the connector lock 418 can extend through corresponding apertures 430 of the cable connector 416, thus locking the cable connector in place.

Figure 5:
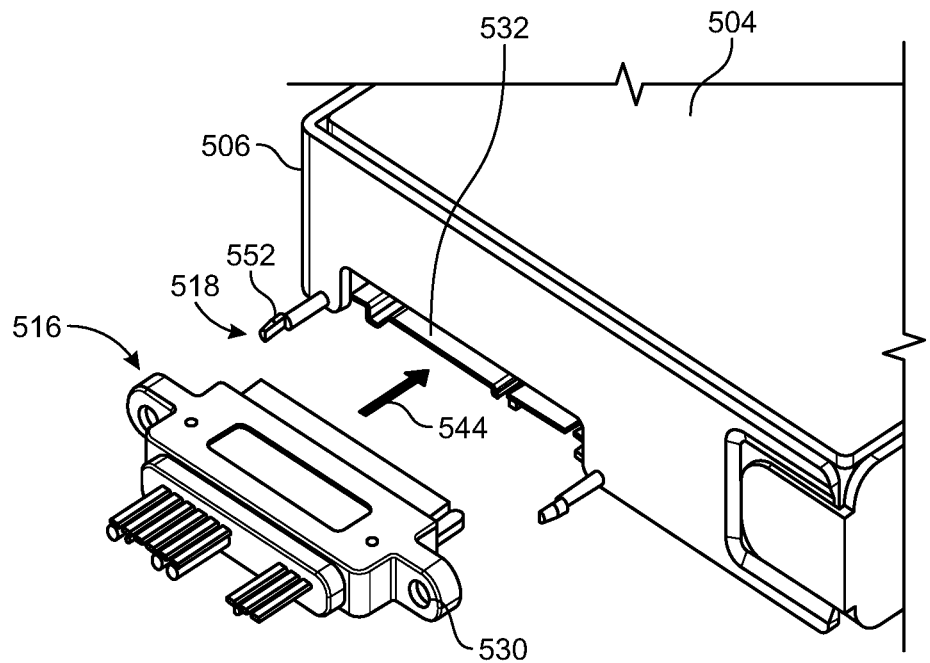
FIG. 5 is a close-up isometric view of a cable connector aligned for coupling to a drive carrier, according to certain aspects of the present disclosure.

FIG. 5 is a close-up isometric view of a cable connector 516 aligned for coupling to a drive carrier 506, according to certain aspects of the present disclosure. The drive carrier 506, drive 504, cable connector 516, and connector lock 518 can be drive carrier 106, drive 104, distal cable connector 116, and connector lock 118 of FIG. 1, respectively.

Figure 9:
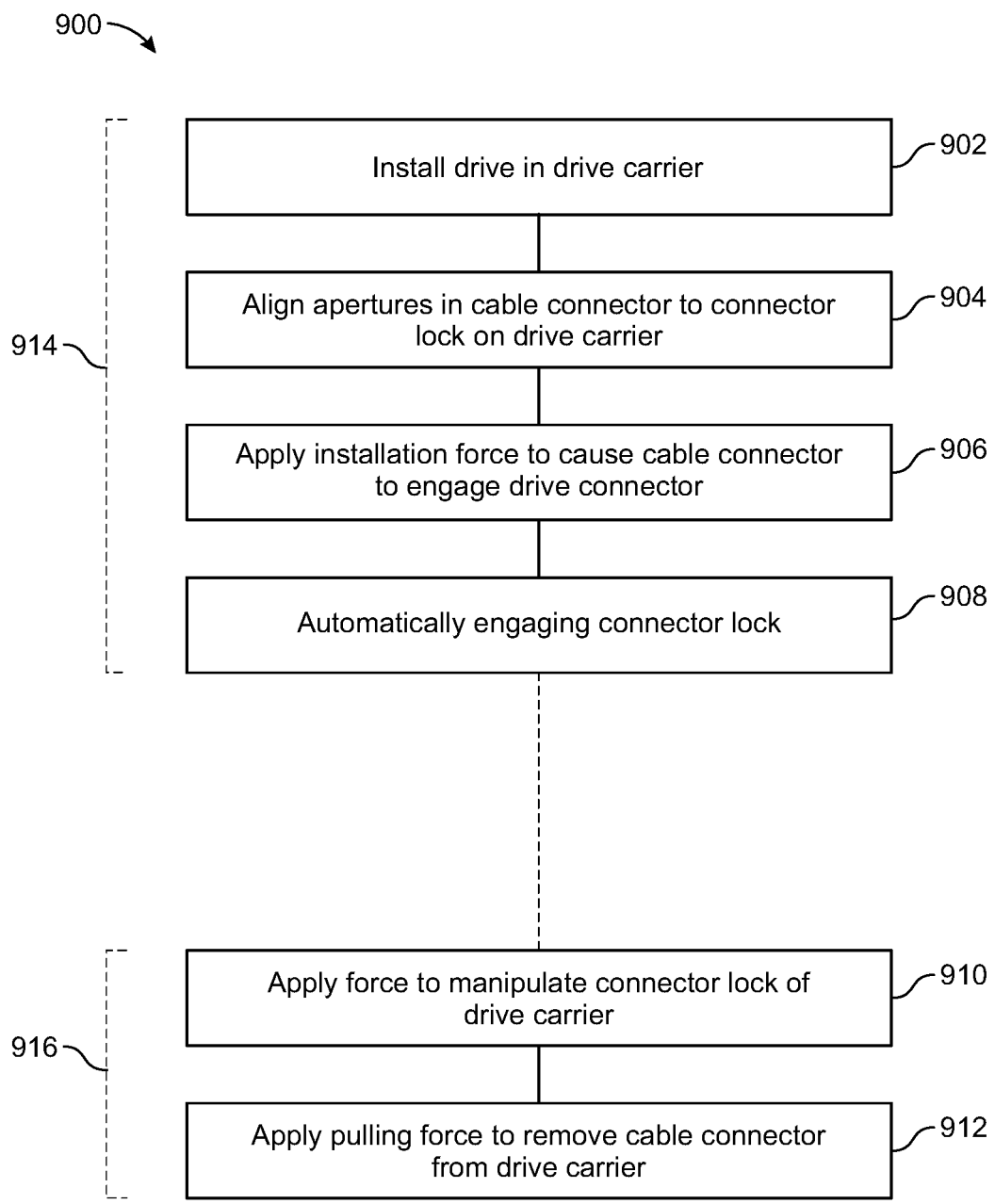
FIG. 9 is a flowchart depicting a process for using a drive carrier, according to certain aspects of the present disclosure.

To move the cable connector 516 from a disconnected configuration (as shown) to a locked configuration (e.g., as depicted in FIG. 9), the cabled connector 516 can be inserted towards the drive connector 532 in direction 544. When being moved in direction 544, the apertures 530 of the cable connector 516 can fit around pins 552 of the connector lock 518. Thus, the connector lock 518 can facilitate alignment of the cable connector 516 with respect to the drive carrier 506.

Figure 6:
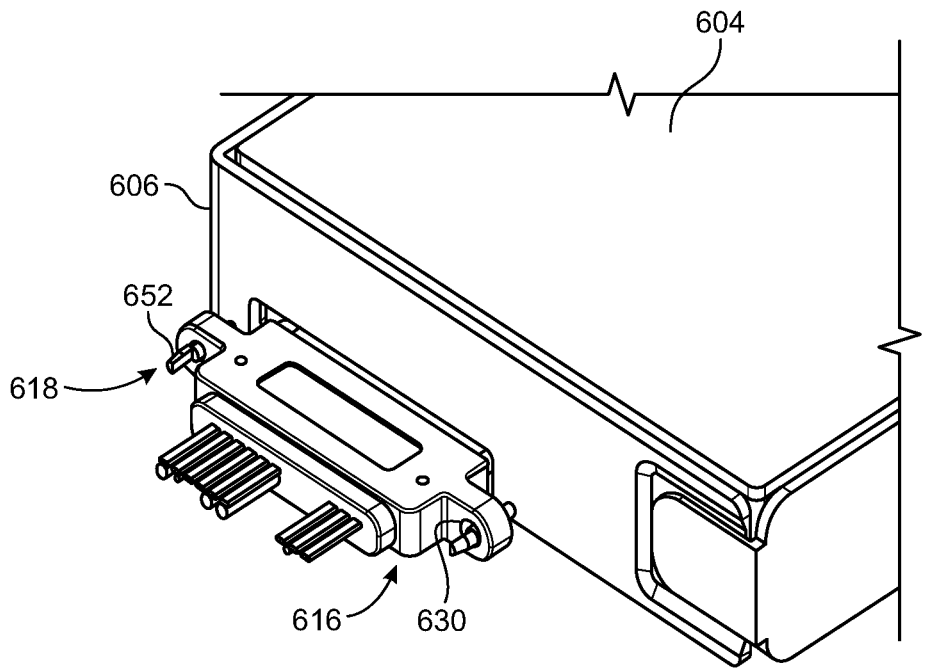
FIG. 6 is a close-up isometric view of a cable connector coupled to a drive carrier, according to certain aspects of the present disclosure.

FIG. 6 is a close-up isometric view of a cable connector 616 coupled to a drive carrier 606, according to certain aspects of the present disclosure. The drive carrier 606, cable connector 616, and connector lock 618 can be drive carrier 506, distal cable connector 516, and connector lock 518 of FIG. 5, respectively, in a locked configuration.

In the locked configuration, the cable connector 616 is held in position with respect to the drive carrier 606 and engaging the drive connector of drive 604. The cable connector 616 is held in position by pins 652 of connector lock 618 engaging the corresponding apertures 630 of cable connector 616.

Figure 7:
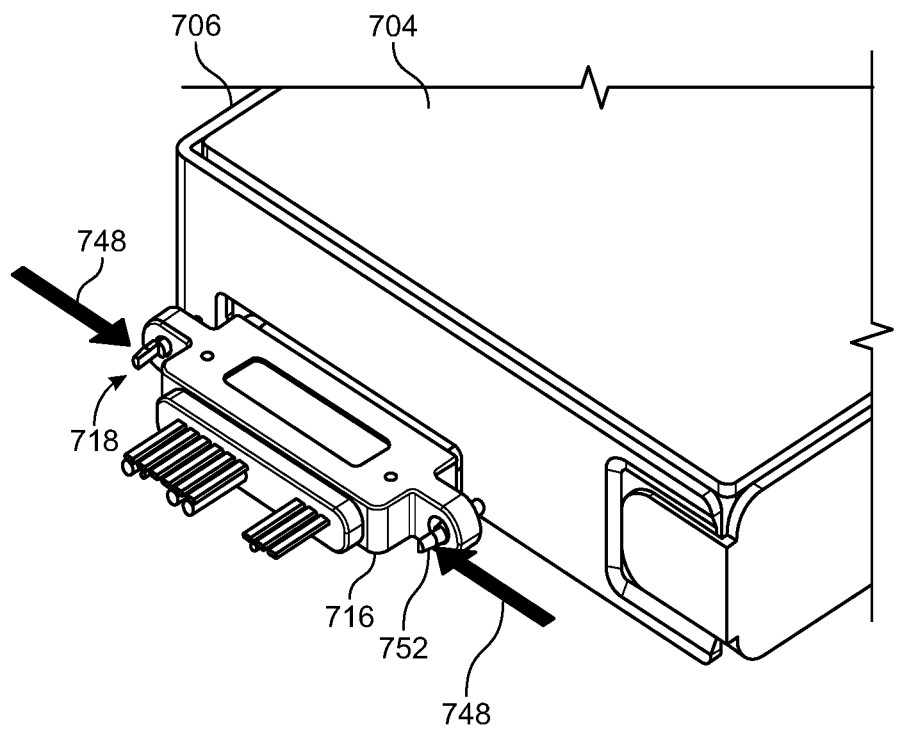
FIG. 7 is a close-up isometric view of a cable connector before removal from a drive carrier, according to certain aspects of the present disclosure.

FIG. 7 is a close-up isometric view of a cable connector 716 before removal from a drive carrier 706, according to certain aspects of the present disclosure. The drive carrier 706, cable connector 716, and connector lock 718 can be drive carrier 606, distal cable connector 616, and connector lock 618 of FIG. 6, respectively. To separate the cable connector 716 from the drive carrier 706 (and thus separate the cable connector 716 from the drive connector of the drive 704), the connector lock 718 is manipulated.

As depicted in FIG. 7, manipulation of the connector lock 718 includes applying force in direction 748. Direction 748 is the direction from the outside of the pin 752 towards the cable connector 716, or from outside the pin 752 towards the opening in the drive carrier 706 that exposes the drive connector of drive 706. For the two pins 752 of FIG. 7, direction 748 is opposite for each pin, since the direction from outside the pin 752 towards the cable connector 716 or towards the opening in the drive carrier 706 is opposite. The directions 748 depicted in FIG. 7 are based on the shape of pins 752, as having cantilever-type snap-fit configurations with a ledge extending away from the center of the cable connector 716. However, in some cases, the connector lock 718 can take on different shapes and styles, in which case force in different direction(s) may be applied to manipulate the connector lock 718 to permit removal of the cable connector 716.

Figure 8:
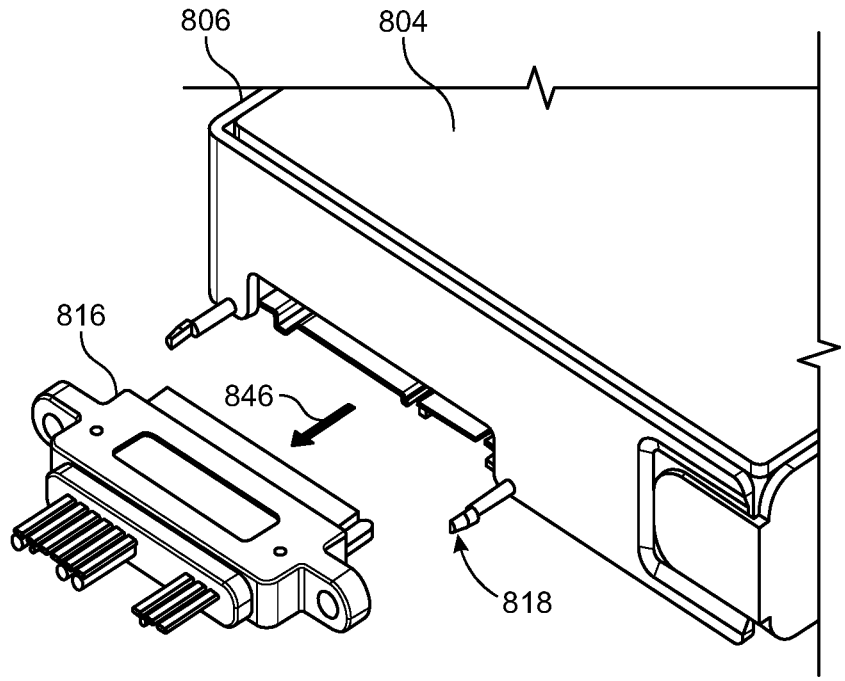
FIG. 8 is a close-up isometric view of a cable connector after decoupling from a drive carrier, according to certain aspects of the present disclosure.

FIG. 8 is a close-up, isometric view of a cable connector 816 after decoupling from a drive carrier 806, according to certain aspects of the present disclosure. The drive carrier 806, cable connector 816, and connector lock 818 can be drive carrier 706, distal cable connector 716, and connector lock 718 of FIG. 7, respectively, after application of force along direction 748 and removal of the cable connector 716.

Cable connector 816 is shown removed from drive carrier 806, and thus disconnected from the drive connector of drive 804. Removal of cable connector 816 in direction 846 is only permitted after manipulation of the connector lock 818 (as depicted in FIG. 7).

FIG. 9 is a flowchart depicting a process 900 for using a drive carrier, according to certain aspects of the present disclosure. Process 900 can be used with any suitable drive carrier, such as drive carrier 106 of FIG. 1.

At block 902, a drive can be installed in the drive carrier. Installation of the drive in the drive carrier can include applying force to a snap-fit of the drive carrier to open a carrier door (e.g., by separating a portion of the carrier door from a carrier frame and rotating the carrier door about a hinge coupling the carrier door to the carrier frame), inserting the drive into the carrier frame, then closing the carrier door. In some cases, installing the drive in the drive carrier at block 902 can include fitting the drive over a set of alignment studs (e.g., fitting alignment holes or screw holes of the drive over the alignment studs) of the carrier frame, then closing the carrier door so a set of alignment studs of the carrier door are fit into corresponding openings of the drive. Such alignment can ensure the drive connector of drive is appropriately aligned with respect to the carrier frame and with respect to the connector lock of the carrier frame.

At block 904, the apertures in cable connector (e.g., a distal cable connector of a cable) can be aligned with the connector lock of the drive carrier. In some cases, the apertures in the cable connector can be retention holes, which align with retention pins of the cable lock. At block 906, installation force is applied to the cable connector to engage the drive connector. Such installation force moves the cable connector into a locked configuration and connects the cable connector to the drive connector of the drive. At block 908, the connector lock of the drive carrier is automatically engaged.

Since the connector lock can take the form of a retention pin, such as with a snap-fit arrangement, application of installation force at block 906 can result in automatic engagement of the connector lock at block 908. In an example, as application force is applied at block 906, the retention pins of the connector lock can deflect, permitting the respective ledges of the retention pins to pass through the corresponding apertures (e.g., retention holes) of the cable connector. Once the ledges are past the apertures, the retention pins can return from being deflected, thus automatically engaging the connector lock and locking the cable connector in place with respect to the drive carrier.

Blocks 902, 904, 906, and 908 make up a sub-process 914 for installing a drive and connecting the cable connector. In some cases, process 900 optionally includes sub-process 916 for removing the cable connector, which includes blocks 910, 912.

At block 910, the force can be applied to manipulate the connector lock of the drive carrier. Manipulating the connector lock can include squeezing together a pair of retention pins, or otherwise applying force to suitably flex, bend, or deflect the retention pins so that the retention pins can fit through the corresponding apertures of the cable connector. While force is being applied at block 910 to manipulate the connector lock, pulling force can be applied at block 912 to remove the cable connector from the drive carrier. Removal of the cable connector can include decoupling of the cable connector from the drive connector and withdrawal of the cable connector from the connector lock.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art. Numerous changes to the disclosed embodiments can be made in accordance with the disclosure herein, without departing from the spirit or scope of the invention. Thus, the breadth and scope of the present invention should not be limited by any of the above described embodiments.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

What is claimed is:

1. A drive carrier, comprising:
    a carrier frame for receiving a drive, the carrier frame including a connector opening positioned to permit a connector of a cable to establish a connection with a connector of the drive when the drive is received by the carrier frame;
    a carrier door coupled to the carrier frame and movable between an open position and a closed position, wherein the carrier door permits insertion of the drive into, or removal of the drive out of, the carrier frame when the carrier door is in the open position, and wherein the carrier door retains the drive within the carrier frame when the carrier door is in the closed position; and
    a connector lock coupled to the carrier frame, the connector lock configured to prevent disconnection of the connector of the cable when the connector lock is engaged;
    wherein the connector lock includes a pair of retention pins positioned on opposite ends of the connector opening, wherein each of the pair of retention pins is elastically deflectable towards the other from a resting position to a disengage position, and wherein the connector lock permits disconnection of the connector of the cable when each of the retention pins is in its respective disengaged position.

2. The drive carrier of claim 1, further comprising a damping coupling coupled to the carrier frame, the damping coupling operable to couple the carrier frame to an object and to vibrationally isolate the carrier frame from the object.

3. The drive carrier of claim 1, wherein the connector lock includes a retention pin for engaging a retention hole of the connector of the cable.

4. The drive carrier of claim 3, wherein the connector lock includes an additional retention pin, wherein the retention pin and the additional retention pin are located on opposite ends of the connector opening.

5. The drive carrier of claim 1, wherein the carrier door is configured to facilitate insertion of the drive into, or removal of the drive out of, the carrier without the use of tools.

6. A system, comprising:
a chassis;
a motherboard coupled to the chassis;
a drive carrier coupled to the chassis, the drive carrier housing a drive having a drive connector, the drive carrier vibrationally isolating the drive from the chassis, the drive carrier having a connector lock; and
a data cable operatively coupling the drive to the motherboard, the data cable having a cable connector operatively coupled to the drive connector, wherein the connector lock of the drive carrier releasably engages the cable connector to prevent decoupling of the cable connector and the drive connector;
wherein the connector lock includes a pair of retention pins positioned on opposite ends of a connector opening, wherein the connector opening is positioned to permit the cable connector to establish a connection with the drive connector, and wherein each of the pair of retention pins is elastically deflectable towards the other from a resting position to a disengaged position, wherein the connector lock permits disconnection of the cable connector from the drive connector when each of the retention pins is in its respective disengaged position.

7. The system of claim 6, wherein the drive carrier is coupled to the chassis by a damping coupling.

8. The system of claim 6, wherein the connector lock includes a retention pin extending from a frame of the drive carrier.

9. The system of claim 8, wherein the connector lock includes an additional retention pin extending from the frame of the drive carrier, wherein the retention pin and the additional retention pin are positioned on opposite ends of a connector opening, the connector opening positioned to permit the cable connector to establish a connection with the drive connector.

10. The system of claim 6, wherein the drive carrier includes a carrier door coupled to a carrier frame and movable between an open position and a closed position, wherein the carrier door permits insertion of the drive into, or removal of the drive out of, the carrier frame when the carrier door is in the open position, and wherein the carrier door retains the drive within the carrier frame when the carrier door is in the closed position.

11. The system of claim 10, wherein the carrier door is configured to facilitate insertion of the drive into or removal of the drive out of the carrier without the use of tools.

12. A method, comprising:
providing a drive carrier having a carrier frame, a carrier door, and a connector lock;
installing a drive in the drive carrier, the drive having a drive connector, wherein installing the drive includes opening the carrier door to permit insertion of the drive, inserting the drive, and closing the carrier door to retain the drive in the drive carrier;
securing the drive carrier to a chassis housing a motherboard;
operatively coupling the drive to the motherboard using a cable having a cable connector, wherein operatively coupling the drive to the motherboard includes operatively coupling the cable connector and the drive connector; and
engaging the connector lock to prevent the cable connector from disconnecting from the drive connector;
wherein the connector lock includes a pair of retention pins positioned on opposite ends of a connector opening, wherein the connector opening is positioned to permit the cable connector to couple with the drive connector, wherein the method further comprises disengaging the connector lock and removing the cable connector, wherein disengaging the connector lock includes moving each of the pair of retention pins to a disengaged position by applying force on the respective retention pin to deflect the respective retention pin towards the other retention pin, and wherein the connector lock permits disconnection of the cable connector from the drive connector when each of the retention pins is in its respective disengaged position.

13. The method of claim 12, wherein securing the drive carrier includes coupling the drive carrier to the chassis using a damping coupling.

14. The method of claim 12, wherein engaging the connector lock occurs automatically in response to coupling the cable connector and the drive connector.

15. The method of claim 12, wherein engaging the connector lock includes passing a retention pin of the connector lock through an aperture of the cable connector.

16. The method of claim 12, wherein installing the drive in the drive carrier is performed without the use of tools.

17. The method of claim 12, wherein engaging the connector lock includes engaging a retention pin of the connector lock with a corresponding aperture of the cable connector in a snap-fit arrangement.

* * * * *